United States Patent
Kim et al.

(10) Patent No.: US 10,064,190 B2
(45) Date of Patent: Aug. 28, 2018

(54) METHOD AND APPARATUS FOR PROCESSING DATA IN BASE STATION

(71) Applicant: ELECTRONICS AND TELECOMMUNICATIONS RESEARCH INSTITUTE, Daejeon (KR)

(72) Inventors: Jun Sik Kim, Daejeon (KR); Yong Seouk Choi, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 246 days.

(21) Appl. No.: 14/969,013

(22) Filed: Dec. 15, 2015

(65) Prior Publication Data

US 2016/0174208 A1   Jun. 16, 2016

(30) Foreign Application Priority Data

Dec. 16, 2014   (KR) .................. 10-2014-0181852

(51) Int. Cl.

| | |
|---|---|
| *H04W 4/00* | (2018.01) |
| *H04W 72/04* | (2009.01) |
| *H04W 16/28* | (2009.01) |
| *H04W 28/22* | (2009.01) |
| *H04W 88/08* | (2009.01) |
| *H04L 12/815* | (2013.01) |
| *H04L 12/26* | (2006.01) |
| *H04W 40/06* | (2009.01) |
| *H04W 28/02* | (2009.01) |

(52) U.S. Cl.
CPC ......... *H04W 72/046* (2013.01); *H04L 47/225* (2013.01); *H04W 16/28* (2013.01); *H04W 28/22* (2013.01); *H04W 88/08* (2013.01); *H04L 43/16* (2013.01); *H04W 28/0226* (2013.01); *H04W 40/06* (2013.01)

(58) Field of Classification Search
None
See application file for complete search history.

(56) References Cited

U.S. PATENT DOCUMENTS

2006/0111149 A1   5/2006   Chitrapu et al.
2006/0154667 A1*  7/2006   Seo .................. H04W 16/00
                                               455/446

(Continued)

FOREIGN PATENT DOCUMENTS

EP         3101846 A1 *  12/2016  ......... H04L 12/6418
KR   10-2005-0098780 A    10/2005

(Continued)

*Primary Examiner* — Ajit Patel
*Assistant Examiner* — Lionel Preval
(74) *Attorney, Agent, or Firm* — Rabin & Berdo, P.C.

(57) ABSTRACT

In a communication environment using a millimeter wave band, a method and apparatus that enable a base station to process data are provided. A protocol stack is generated based on a characteristic of traffic that is provided to a terminal, and the generated protocol stack is allocated to the terminal. Data to be provided to the terminal is processed according to the generated protocol stack, and data that is processed through a beam that is allocated based on a position vector of the terminal is transmitted.

15 Claims, 5 Drawing Sheets

(56) References Cited

U.S. PATENT DOCUMENTS

| | | | |
|---|---|---|---|
| 2011/0044237 A1 | 2/2011 | Oh et al. | |
| 2011/0218006 A1* | 9/2011 | Hanaki | H04W 76/027 |
| | | | 455/509 |
| 2013/0157676 A1 | 6/2013 | Baek et al. | |
| 2014/0328190 A1* | 11/2014 | Lord | H04W 24/08 |
| | | | 370/252 |
| 2015/0124604 A1* | 5/2015 | Dao | H04W 28/0247 |
| | | | 370/231 |
| 2016/0095108 A1* | 3/2016 | Ryoo | H04L 5/0007 |
| | | | 370/329 |

FOREIGN PATENT DOCUMENTS

| | | |
|---|---|---|
| KR | 10-2009-0011585 A | 2/2009 |
| KR | 10-2010-0064234 A | 6/2010 |
| KR | 10-2010-0078204 A | 7/2010 |

* cited by examiner

FIG. 4

| UEID | Serviced beam | Serviced beam | Mobility information | Cell edge information |

METHOD AND APPARATUS FOR PROCESSING DATA IN BASE STATION

CROSS-REFERENCE TO RELATED APPLICATION

This application claims priority to and the benefit of Korean Patent Application No. 10-2014-0181852 filed in the Korean Intellectual Property Office on Dec. 16, 2014, the entire contents of which are incorporated herein by reference.

BACKGROUND OF THE INVENTION (a) Field of the Invention

The present invention relates to a method and apparatus for processing data in a base station.

(b) Description of the Related Art

With the development of mobile communication technology, wireless data usage is rapidly growing, and accordingly, in order to satisfy a continuously increasing wireless data traffic demand, a wireless communication system has developed in a direction for supporting a higher data rate.

To increase the data rate, the existing wireless communication system has performed technology development in a direction of enhancing spectral efficiency. However, due to increased demand of smart phones and tablet personal computers (PC) and an explosive increase of application programs requiring a large amount of data traffic based on the demand increase, when requests for data traffic are further accelerated, it is difficult to satisfy the increasing wireless data traffic demand with only such spectral efficiency enhancement technology.

One method for solving such a problem is to use a very wide frequency band. In a frequency band of less than 10 GHz used in an existing mobile communication cellular system, it is very difficult to secure a wide frequency band. In a higher frequency band, it is necessary to secure such a wideband frequency. However, as a transmitting frequency for wireless communication increases, a propagation path loss increases. Thereby, a propagation arrival distance is relatively shortened and thus service coverage is reduced. One of important technologies for solving the problem, i.e., to mitigate a propagation path loss and increase a propagation transfer distance, is beamforming technology.

In a millimeter wave (mmWave) environment, when forming a cell with a plurality of beams based on beamforming, beam switching technology of low delay according to a user movement is required, and a base station apparatus that can process high speed data of a large capacity occurring in a millimeter wave environment with low delay is requested.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide a method and apparatus in which a base station can process data at a high speed in a communication environment using a millimeter wave band.

An exemplary embodiment of the present invention provides a method in which a base station processes data in a communication environment using a millimeter wave band, including: generating a protocol stack based on a characteristic of traffic that is provided to a terminal and allocating the generated protocol stack to the terminal; processing data to be provided to the terminal according to the generated protocol stack; and transmitting the processed data through a beam that is allocated based on a position vector of the terminal.

The generating of a protocol stack based on a characteristic of traffic that is provided to a terminal and allocating the generated protocol stack to the terminal may include: comparing a traffic use amount of a present bandwidth and a threshold value of a traffic window; and generating a new protocol stack when the traffic use amount exceeds a threshold value of a traffic window.

The generating of a protocol stack based on a characteristic of traffic that is provided to a terminal and allocating the generated protocol stack to the terminal may include: comparing a data processing rate of the terminal and a preset threshold processing rate; and generating a new protocol stack when the data processing rate is higher than the threshold processing rate.

The data processing rate may be a data processing rate per Transmit Time Interval (TTI).

The generating of a protocol stack based on a characteristic of traffic that is provided to a terminal and allocating the generated protocol stack to the terminal may include: comparing a traffic window and a beam vector allocation window; and generating a new protocol stack if the traffic window is larger than the beam vector allocation window.

The comparing of a traffic window and a beam vector allocation window may be performed if the data processing rate is not higher than a preset threshold processing rate.

The comparing of a data processing rate of the terminal and a preset threshold processing rate may be performed when it is determined that the terminal is not located at a cell edge.

It may be determined whether the terminal is located at a cell edge based on a position vector of the terminal, and the position vector may be determined based on measurement information that is received from the terminal, wherein the measurement information may include a measurement value of a beam in which the terminal receives a service, a measurement value of a peripheral beam, and an identifier of the terminal.

The transmitting of the processed data may include transmitting data through a beam that is allocated to the terminal based on a UE vector.

The method may further include generating, by the terminal, a user equipment (UE) vector and transmitting the UE vector to the base station, wherein the UE vector may include a UEID, information of a beam in which the terminal receives a service, information of a peripheral beam, mobility of the terminal, and cell edge information representing whether the terminal is located at a cell edge.

The terminal may generate a UE vector according to a UE vector generation rule that is included in beam-related information that is broadcasted to the base station, update a UE vector according to a UE vector update rule that is included in the beam-related information, and transmit the generated or updated UE vector to the base station.

Another embodiment of the present invention provides an apparatus that enables a base station to process data in a communication environment using a millimeter wave band, including: a protocol processor that is formed with a multiple processor core to operate a plurality of protocol stacks, that allocates a protocol stack that is generated based on a characteristic of traffic that is provided to a terminal to the terminal, and that processes data according to a protocol stack that is allocated to the terminal; a traffic classification unit that monitors a traffic use amount of a present bandwidth using a traffic window and that generates a traffic processing state according to a monitoring result; a resource management unit that generates a new protocol stack based on the traffic processing state, that allocates a protocol stack that is generated through the protocol processor to a terminal, and that allocates a beam resource to the terminal; a beam selector that switches data that is provided from the protocol processor to a beam that is allocated to the terminal; and a transmitting processor that transmits the data to the terminal through a beam that is switched through the beam selector.

The resource management unit may generate a new protocol stack, when a traffic use amount of a present bandwidth exceeds a threshold value of a traffic window based on the traffic processing state.

The resource management unit may generate a new protocol stack, when a data processing rate of the terminal is higher than a preset threshold processing rate based on the traffic processing state, and the data processing rate may be a data processing rate per Transmit Time Interval (TTI).

The resource management unit may compare a traffic window and a beam vector allocation window and generate a new protocol stack according to a comparison result.

The protocol stack may be matched to a UE vector, and the UE vector may include a UEID, information of a beam in which the terminal receives a service, information of a peripheral beam, mobility of the terminal, and cell edge information representing whether the terminal is located at a cell edge.

BRIEF DESCRIPTION OF THE DRAWINGS

FIG. 4 is a block diagram illustrating a configuration of a UE vector according to an exemplary embodiment of the present invention.

DETAILED DESCRIPTION OF THE EMBODIMENTS

Figure 1:
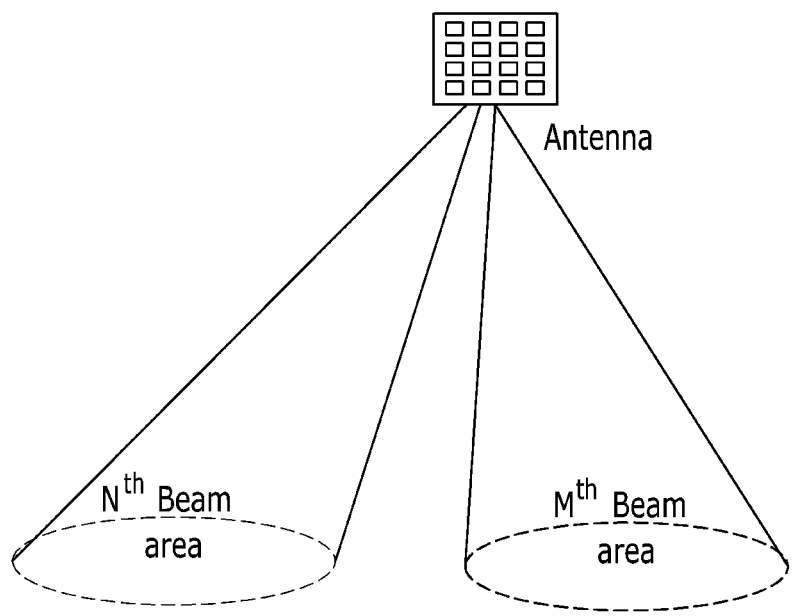
FIG. 1 is a diagram illustrating a mobile communication environment according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in an entire specification, unless explicitly described to the contrary, the word "comprise" and variations such as "comprises" or "comprising" will be understood to imply the inclusion of stated elements but not the exclusion of any other elements.

In the entire specification, a terminal may indicate a mobile terminal (MT), a mobile station (MS), an advanced mobile station (AMS), a high reliability mobile station (HR-MS), a subscriber station (SS), a portable subscriber station (PSS), an access terminal (AT), and user equipment (UE), and may include an entire function or a partial function of the MT, the MS, the AMS, the HR-MS, the SS, the PSS, the AT, and the UE.

Further, a base station (BS) may indicate an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) that performs a BS function, a relay node (RN) that performs a BS function, an advanced relay station (ARS) that performs a BS function, a high reliability relay station (HR-RS) that performs a BS function, and a small BS [a femto BS, a home node B (HNB), a home eNodeB (HeNB), a pico BS, a metro BS, and a micro BS], and may include an entire function or a partial function of the ABS, the nodeB, the eNodeB, the AP, the RAS, the BTS, the MMR-BS, the RS, the RN, the ARS, the HR-RS, and the small BS.

Hereinafter, a method and an apparatus for processing data according to an exemplary embodiment of the present invention will be described with reference to the drawings.

FIG. 1 is a diagram illustrating a mobile communication environment according to an exemplary embodiment of the present invention.

In a millimeter wave (mmWave) band-based mobile communication environment, a service is provided through a plurality of beams within one cell. For example, 32 beam areas may exist within one base station, and each beam area may support a maximum of 3.2 Gbps data transmission capacity using a 1 GHz bandwidth.

In this way, in a network that is operated based on a multiple beam and based on a cell, as a signal that is transmitted through a specific beam is reflected to another beam area by a building, etc., due to a frequency characteristic, interference may be caused, and as a plurality of relay base stations transmits a beam, beam interference may exist. A dead zone exists in which QoS is largely deteriorated due to interference.

In such a channel environment, beamforming may be applied. A plurality of beam areas exist within a base station based on beamforming, and as shown in FIG. 1, an N-th beam area and an M-th beam area may exist. Such beam areas may form one cell.

In a mobile communication environment based on such a millimeter wave band, a base station may be formed with a multiple processor core.

Figure 2:
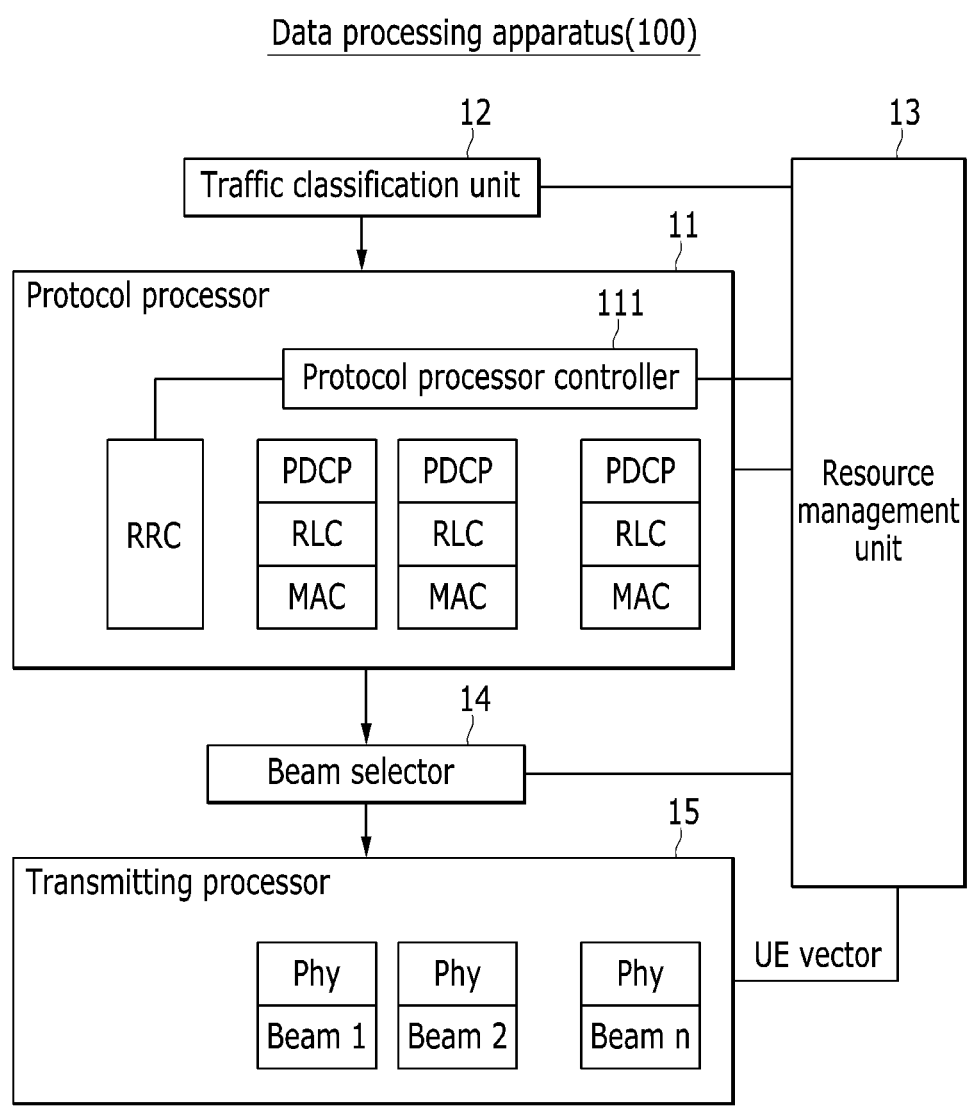
FIG. 2 is a block diagram illustrating a configuration of a data processing apparatus of a base station according to an exemplary embodiment of the present invention.

FIG. 2 is a block diagram illustrating a configuration of a data processing apparatus of a base station according to an exemplary embodiment of the present invention.

As shown in FIG. 2, a data processing apparatus 100 of the base station according to an exemplary embodiment of the present invention includes a protocol processor 11, a traffic classification unit 12, a resource management unit 13, a beam selector 14, and a transmitting processor 15.

The protocol processor 11 is formed with a multiple processor core to operate a plurality of protocol stacks. For this, the protocol processor 11 may includes a protocol processor controller 111 for operating a plurality of protocol stacks.

The traffic classification unit 12 classifies data that are input through an external interface. Specifically, the traffic classification unit 12 classifies data according to a predetermined reference (e.g., a service kind), and monitors a traffic use amount of a present bandwidth using a traffic window. A traffic processing state according to a monitoring result using a traffic window is provided to the resource management unit 13.

The resource management unit 13 manages and allocates a resource. When a traffic use amount approaches a threshold value of a traffic window based on a traffic processing state that is transferred from the traffic classification unit 12, the resource management unit 13 generates a new protocol stack and allocates the new protocol stack to a terminal. The protocol stack is allocated based on a terminal, and is matched to a UE vector corresponding to the terminal and thus the protocol stack is allocated. A traffic processing state includes a data processing rate and a traffic use amount, and even when a data processing rate is higher than a preset threshold value, the resource management unit 13 may generate a new protocol stack and allocate the new protocol stack to the terminal.

Further, the resource management unit 13 generates a position vector based on measurement information that is provided from the terminal and performs beam resource allocation based on the position vector. The position vector is matched to a UE vector to be used.

When describing a process in which beam resource allocation is performed, the terminal measures each of measurement values of a beam that presently receives a service from the base station and a peripheral beam, and transmits measurement information including an identifier (e.g., user equipment identifier (UEID)) of the terminal and measurement values to the base station. The resource management unit 13 of the base station generates a position vector based on an identifier of the terminal that is included in measurement information and measurement values of beams, and a direction and a magnitude of the position vector may be adjusted according to the measurement values. When a terminal moves from an edge of a random cell to the outside of the cell, a handover process may be performed. When a position vector of the terminal is located at a cell edge, the resource management unit 13 requests handover preparation for radio resource connection (RRC), determines a processing rate of the beam selector 14, compares a traffic window and a beam vector allocation window, and generates a new protocol stack. The traffic window represents a data state in a transmitting request state after being written according to a terminal based on a radio resource control (RLC) buffer size representing presently awaiting data. The beam vector allocation window is an index representing a UE that is presently allocated to a beam, and has a threshold value on a beam basis. When request data are larger than a capacity of a present protocol stack based on a comparison result of such a traffic window and a beam vector allocation window, a new protocol stack is generated or handover is driven with reference to a position vector. The traffic window may be operated based on a UE, and the beam vector allocation window may be operated based on a beam.

The resource management unit 13 allocates a beam to a terminal based on a position vector of the terminal, and a UE vector corresponding to the terminal functions as an index to be matched to a beam that is allocated to the terminal.

The beam selector 14 allocates one beam of a plurality of beams that a base station can allocate to a terminal and performs beam switching to the allocated beam. That is, the beam selector 14 performs beam switching of a beam to provide it to a terminal according to beam allocation information that is provided from the resource management unit 13. Accordingly, the beam selector 14 may be referred to as a "beam selecting switch".

The protocol processor 11 generates a new protocol stack according to the control of the resource management unit 13, and processes and outputs traffic data that should be provided to the terminal and that is transferred from the traffic classification unit 12 according to the generated protocol stack.

The transmitting processor 15 transmits data that is output from the protocol processor 11, and particularly, transmits data to a terminal through a beam that is designated to a UE vector that is transferred from the resource management unit 13. The transmitting processor 15 transmits data to a terminal through a beam that is switched by the beam selector 14.

Hereinafter, a method of processing data according to an exemplary embodiment of the present invention will be described.

Figure 3:
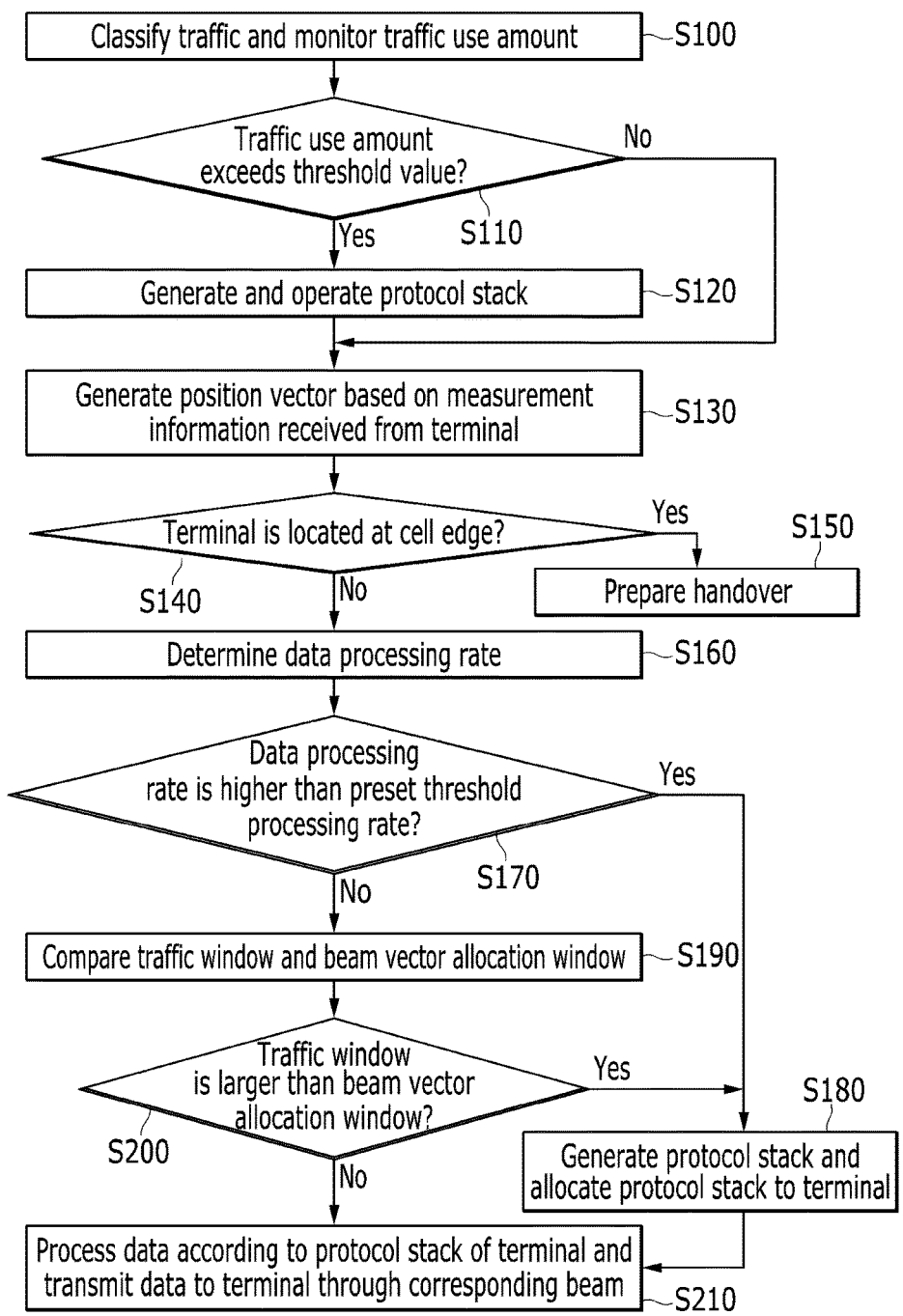
FIG. 3 is a flowchart illustrating a method of processing data according to an exemplary embodiment of the present invention.

FIG. 3 is a flowchart illustrating a method of processing data according to an exemplary embodiment of the present invention.

The data processing apparatus 100 of the base station classifies traffic and monitors a traffic use amount of a present bandwidth using a traffic window on a classified traffic basis (S100). By comparing a traffic window and a traffic use amount, the data processing apparatus 100 determines whether the traffic use amount exceeds a threshold value of a traffic window (S110), and if the traffic use amount exceeds a threshold value of a traffic window, the data processing apparatus 100 generates a new protocol stack and operates the new protocol stack based on the terminal (S120). The generated protocol stack may be allocated to a terminal to which corresponding traffic is provided.

The data processing apparatus 100 of the base station receives measurement information from a terminal and generates a position vector based on the measurement information (S130). For example, the terminal transmits measurement information including a measurement value 1 of a beam that presently receives a service, a measurement value 2 of a peripheral beam, and an identifier (e.g., UEID) of the terminal to the base station, and the base station receives such measurement information. Here, the measurement value 2 of a peripheral beam may be one or more. A position vector is generated based on an identifier of the terminal that is included in measurement information and measurement values of beams. The position vector may be used when allocating a beam to the terminal.

The data processing apparatus 100 determines whether the terminal is located at a cell edge based on a position vector of the terminal (S140), and if the terminal is located at a cell edge, the data processing apparatus 100 prepares handover to another cell (S150). Such handover processing may be performed based on technology that is known in the art and thus a detailed description thereof will be omitted.

If the terminal is not located at a cell edge, the data processing apparatus 100 determines a data processing rate per transmitting cycle of the terminal (S160). Here, a transmitting cycle may be a Transmit Time Interval (TTI), one TTI includes a plurality of symbols, and each symbol may be transmitted through a plurality of resource blocks constituting a radio resource that is formed with a time axis and a frequency axis.

The data processing apparatus 100 determines whether a data processing rate per transmitting cycle of the terminal is higher than a preset threshold processing rate (S170), and if a data processing rate per transmitting cycle of a terminal is higher than a preset threshold processing rate, the data processing apparatus 100 generates a new protocol stack and allocates the new protocol stack to the terminal (S180).

If a data processing rate per transmitting cycle of a terminal is not higher than a preset threshold processing rate, the data processing apparatus 100 compares a traffic window and a beam vector allocation window (S190). The data processing apparatus 100 determines whether a traffic window is larger than a beam vector allocation window (S200), and if the traffic window is larger than a beam vector allocation window, the data processing apparatus 100 generates a new protocol stack and allocates the new protocol stack to the terminal (S180).

While the data processing rate per transmitting cycle of a terminal is not higher than a preset threshold processing rate and if the traffic window is smaller than a beam vector allocation window, a data processing of the terminal is performed based on an existing protocol stack without generation of a new protocol stack.

Thereafter, the data processing apparatus 100 processes data to provide to a terminal according to a corresponding protocol stack, and transmits data through a beam that is allocated based on a position vector of the terminal (S210).

In the above-described method of processing data, a UE vector may be formed in a structure of FIG. 4.

FIG. 4 is a block diagram illustrating a configuration of a UE vector according to an exemplary embodiment of the present invention.

As shown in FIG. 4, a UE vector includes beam information that is serviced to a terminal based on a UEID and peripheral beam information, which is a beam switching target, and may include mobility information of the terminal and cell edge information representing whether the terminal is located at a cell edge.

Such a UE vector may be generated as follows.

Figure 5:
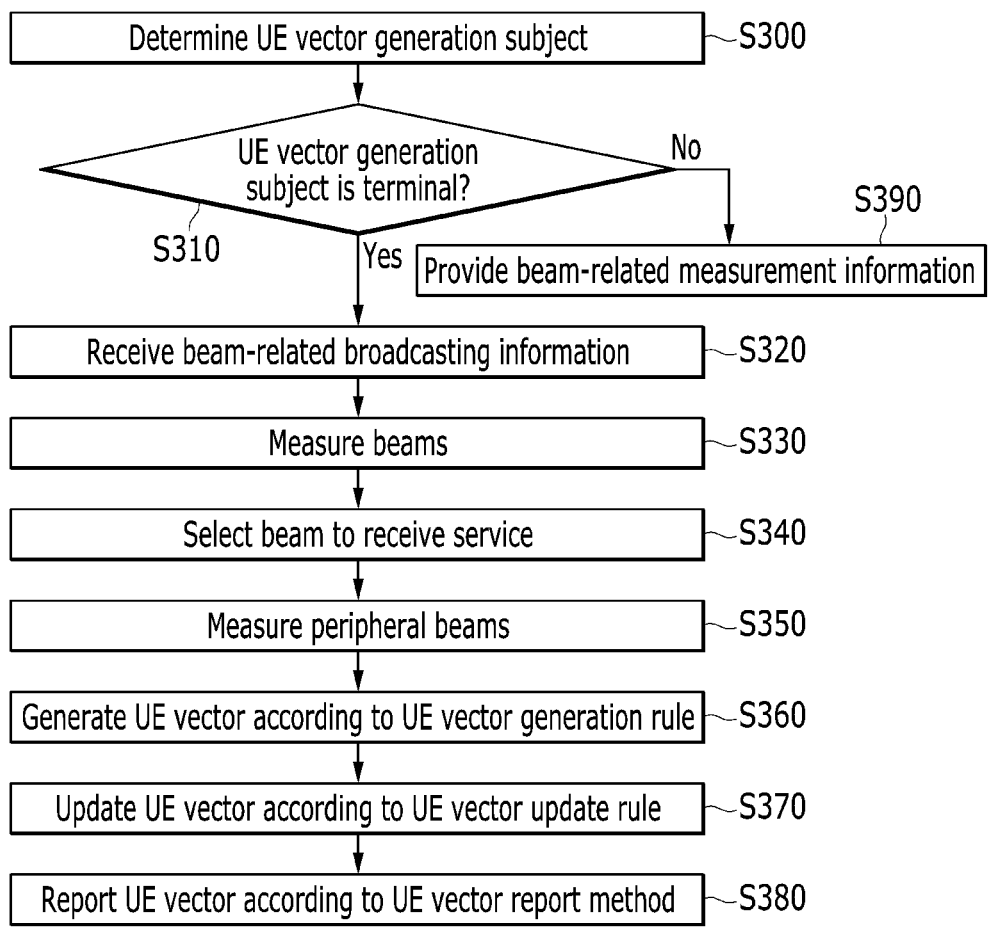
FIG. 5 is a flowchart illustrating a process of generating a UE vector according to an exemplary embodiment of the present invention.

FIG. 5 is a flowchart illustrating a process of generating a UE vector according to an exemplary embodiment of the present invention.

A terminal receives a beam location configuration and a UE vector generation rule through broadcasting information. A subject that generates a UE vector may be a resource management device of a base station or a terminal. When a terminal generates a UE vector, the terminal may generate the UE vector according to flow of FIG. 5.

As shown in FIG. 5, a UE vector generation subject is determined (S300) and it is determined whether a UE vector generation subject is a terminal (S310), and if the UE vector generation subject is a terminal, the terminal receives beam-related broadcasting information from a base station (S320). The broadcasting information includes a beam location configuration and a UE vector generation rule, and may further include a UE vector update rule and a UE vector report method.

The terminal generates a UE vector based on beam-related broadcasting information that is received from the base station. For this purpose, the terminal measures beams (S330), selects a beam to receive a service (S340), and measures peripheral beams (S350). The terminal generates a UE vector using a measurement value of a beam to receive a service and peripheral beams according to a UE vector generation rule (S360). The generated UE vector may be formed in a form of FIG. 4.

Further, the terminal updates a UE vector that is generated according to a UE vector update rule (S370).

The terminal reports the generated or updated UE vector to the base station. For example, the terminal reports the UE vector to the base station according to a UE vector report method (S380).

If a UE vector generation subject is not a terminal, the terminal provides beam-related measurement information to the base station according to a measurement request of the base station (S390). The base station generates a UE vector according to beam-related measurement information that the terminal provides, and updates the UE vector as needed.

In such an exemplary embodiment of the present invention, UE vector generation is basically performed in the terminal. The terminal generates a UE vector based on measured beam reception intensity, measures intensity of a periodically received peripheral beam, and measures a receiving change amount of the peripheral beam. The terminal sets a beam having strongest energy, i.e., intensity, to a serving beam based on the information, and sets a beam moving direction based on a receiving change amount of a peripheral beam. The base station allocates a beam resource to the terminal based on such information (a beam moving direction of the terminal, a serving beam, and a receiving change amount) and performs handover. Further, in an initial terminal ability negotiation process, the base station may generate a UE vector according to determination of the base station.

The UE vector update rule is transferred to the terminal through broadcasting information of the base station, and may include updates such as a cyclic update and an event-based update, a report method, and an update cycle.

According to an exemplary embodiment of the present invention, in a millimeter wave band-based mobile communication environment, when operating a multiple beam-based cell, a base station can process data at a high speed.

Particularly, when the base station is formed with a plurality of processor cores, the base station can efficiently allocate a beam resource using measurement information that is provided from a terminal and support a high speed transmit time interval (TTI) for minimizing traffic processing delay. Therefore, data processing delay can be reduced and data can be processed at a high speed.

An exemplary embodiment of the present invention may not only be embodied through the above-described apparatus and/or method, but may also be embodied through a program that executes a function corresponding to a configuration of the exemplary embodiment of the present invention or through a recording medium on which the program is recorded, and can be easily embodied by a person of ordinary skill in the art from a description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method in which a base station processes data in a communication environment using a millimeter wave band, the method comprising:

receiving a user equipment (UE) vector that is from a terminal and comprises cell edge information representing whether the terminal is located at a cell edge;

generating a position vector that is matched with the UE vector;

generating a new protocol stack based on a data processing rate of the terminal when it is determined that the terminal is not located at the cell edge according to the position vector, and allocating the generated protocol stack to the terminal;

processing data to be provided to the terminal according to the generated protocol stack; and transmitting the processed data through a beam that is allocated based on the position vector of the terminal.

2. The method of claim 1, further comprising, before the generating of the position vector, comparing a traffic use amount of a present bandwidth and a threshold value of a traffic window; and generating another new protocol stack when the traffic use amount exceeds a threshold value of a traffic window.

3. The method of claim 1, wherein the generating of the new protocol stack based on the data processing rate of the terminal comprises:

Comparing the data processing rate of the terminal and a preset threshold processing rate when it is determined that the terminal is not located at the cell edge; and generating the new protocol stack when the data processing rate is higher than the threshold processing rate.

4. The method of claim 3, wherein the data processing rate is a data processing rate per Transmit Time Interval (TTI).

5. The method of claim 3, wherein the generating of the new protocol stack based on the data processing rate of the terminal further comprises:

comparing a traffic window and a beam vector allocation window when the data processing rate is not higher than the threshold processing rate; and generating the new protocol stack if the traffic window is larger than the beam vector allocation window.

6. The method of claim 5, wherein the comparing of the traffic window and the beam vector allocation window is performed if the data processing rate is not higher than a preset threshold processing rate.

7. The method of claim 1, wherein the position vector is determined based on measurement information that is received from the terminal, wherein the measurement information comprises a measurement value of a beam in which the terminal receives a service, a measurement value of a peripheral beam, and an identifier of the terminal.

8. The method of claim 1, wherein the transmitting of the processed data comprises transmitting data through a beam that is allocated to the terminal based on the UE vector matched to the position vector.

9. The method of claim 8, wherein the UE vector is measurement information received from the terminal, and the UE vector further comprises a user equipment identifier (UEID), information of a beam in which the terminal receives a service, information of a peripheral beam, and mobility of the terminal.

10. The method of claim 9, wherein the terminal generates the UE vector according to a UE vector generation rule that is included in beam-related information that is broadcasted to the base station, updates the UE vector according to a UE vector update rule that is included in the beam-related information, and transmits the generated or updated UE vector to the base station.

11. A method for an apparatus to enable a base station to process data in a communication environment using a millimeter wave band, the method comprising:

allocating a protocol stack that is generated based on a characteristic of traffic that is provided to a terminal, and processing data according to the protocol stack that is allocated to the terminal;

monitoring a traffic use amount of a present bandwidth using a traffic window and generating a traffic processing state including a data processing rate of the terminal according to a monitoring result;

generating a new protocol stack based on the traffic processing state, allocating the generated protocol stack to the terminal, and allocating a beam resource to the terminal;

switching the data to a beam that is allocated to the terminal; and transmitting the data to the terminal through the beam to which data are switched, wherein the generating the new protocol stack includes generating a position vector matched with a user equipment (UE) vector that is received from the terminal and that comprises cell edge information representing whether the terminal is located at a cell edge, and generating the new protocol stack based on the data processing rate when it is determined that the terminal is not located at the cell edge according to the position vector.

12. The method of claim 11, wherein the new protocol stack is further generated when a traffic use amount of a present bandwidth exceeds a threshold value of a traffic window based on the traffic processing state.

13. The method of claim 11, wherein the new protocol stack is further generated when the data processing rate of the terminal is higher than a preset threshold processing rate based on the traffic processing state, and the data processing rate is a data processing rate per Transmit Time Interval (TTI).

14. The method of claim 13, wherein the generating the new protocol stack further includes comparing a traffic window and a beam vector allocation window when the data processing rate is not higher than the threshold processing rate, and generating the new protocol stack if the traffic window is larger than the beam vector allocation window.

15. The method of claim 11, wherein the protocol stack is matched to the UE vector, and the UE vector further comprises a user equipment identifier (UEID), information of a beam in which the terminal receives a service, information of a peripheral beam, and mobility of the terminal.

* * * * *